United States Patent
Roessler

[11] Patent Number: 5,331,607
[45] Date of Patent: Jul. 19, 1994

[54] SWEEP FREQUENCY VIBRATOR

[76] Inventor: Dennis E. Roessler, P.O. Box 42800, Houston, Tex. 77242-8044

[21] Appl. No.: 23,833

[22] Filed: Feb. 23, 1993

[51] Int. Cl.⁵ ............................................. H04R 23/00
[52] U.S. Cl. ................................... 367/189; 367/190; 181/106; 181/121
[58] Field of Search ................ 367/189, 190; 181/106, 181/119, 121

[56] References Cited
U.S. PATENT DOCUMENTS

| | | | |
|---|---|---|---|
| 4,004,267 | 1/1977 | Mayne | 340/15.5 TA |
| 4,106,586 | 8/1978 | Stafford | 181/121 |
| 4,388,981 | 6/1983 | Fair | 181/119 |
| 4,450,928 | 5/1984 | Weber et al. | 181/121 |
| 4,512,001 | 4/1985 | Mayne et al. | 367/189 |
| 4,680,741 | 7/1987 | Wales et al. | 367/189 |
| 4,692,912 | 9/1987 | Mueller et al. | 367/190 |
| 4,706,231 | 11/1987 | Mueller et al. | 367/190 |
| 4,724,532 | 2/1988 | Perkins et al. | 367/189 |
| 4,855,967 | 8/1989 | Sallas et al. | 367/190 |
| 4,922,473 | 5/1990 | Sallas et al. | 367/189 |
| 5,115,880 | 5/1992 | Sallas et al. | 181/106 |
| 5,137,109 | 8/1992 | Dorel | 181/106 |

*Primary Examiner*—J. Woodrow Eldred
*Attorney, Agent, or Firm*—Arnold, White & Durkee

[57] ABSTRACT

A sweep frequency vibrator is set forth. It has an elongate cylindrical housing closed at the top and bottom ends. On the interior, there is a reactionary mass fixed to identical upper and lower piston ends. They are received in seal isolated chambers, one being formed in a moveable plug. The plug is moved to thereby vary the spacing of the chambers. As the frequency is changed, plug is moved to assure sufficient clearance from the excursion of the reactionary mass. Hydraulic oil under pressure is delivered to control valves, one for each piston end. The two control valves and piston ends have very short flow lines. Moreover the excursion permitted for the plug assures operation without bottoming out.

17 Claims, 1 Drawing Sheet

SWEEP FREQUENCY VIBRATOR

BACKGROUND OF THE DISCLOSURE

A vibrator is a device which is used to form vibrations transmitted into the earth in seismic investigations. A vibrator is a device that is typically installed at the earth's surface to form a vibration which is directed into the earth and reflected by various geological horizons in the earth to thereby provide data indicative of the nature of the seismic formations. The propagation of the vibrations into the earth involves a propagation of a generally spherical wavefront. Thus, the intensity of the energy on a per unit area basis decreases with the square of the distance of the propagation. Since the signal must be propagated into the earth, reflected at a far horizon and return to the surface, the reflected signal is also subject to a square law decrease, the propagation of the signal involves a decrease in intensity which is a function of the fourth power of the distance. This can be reduced significantly by installing a vibrator in a well borehole. Such a vibrator has to be an elongate cylindrical structure to fit in the well borehole. Devices of this sort typically are hydraulically powered. A vibrator therefore is required which converts hydraulic power into vibrations for surface and down hole uses.

The present disclosure is directed to such a system which enables the extension of the frequency range of the device. Using a typical low frequency of 10 hertz as an example, it is desirable that the frequency increase up to some significantly greater level for operation. The response of the seismic formations is different, and therefore a change in frequency provides added information with regard to the formations. The present disclosure is directed to control valves which are connected to provide hydraulic power to both sides of a piston which is in a cylinder to enable the piston to be driven in a double acting mode. The cylinder and piston construction reciprocates a reactionary mass.

Consider as an example a device which operates at 10 hertz. If it is desirable to operate the same vibrator at 600 hertz and output the same force, the system must change the stroke by an amount which is very substantial. An example will be developed below where the stroke at 10 hertz is 1.9 inches while the stroke is reduced at 600 hertz to 0.0005 inches. Focusing for the moment on the power requirements for that, the performance of the hydraulic fluid becomes a significant limiting factor. In other words, the hydraulic oil which is normally assumed to be an incompressible liquid at most circumstances limits the performance. The fact that it is somewhat compressible is dependent primarily on the bulk modulus of the hydraulic oil and the volume of the hydraulic oil that is in the cylinder. The first factor can be enhanced by selection of hydraulic fluids which have the optimum bulk modulus. The last factor more aptly involves the design of the flow lines and the filled region of the cylinder. In other words, the frequency response of the system can be increased if the volume inside the moveable parts is reduced. One way to reduce this is to decrease the volume inside the flow lines. Another way to reduce this volume is to reduce the flow regions of the valves which connect the system. In other words, the volume inside the cylinder is reduced. As will be described in some detail, the present disclosure omits a four-way valve and uses instead two separate three-way valves. The three-way valves are located at opposite ends of the cylinder. Moreover, the three-way valves are immediately adjacent to the ends of the pistons in the cylinder for suitable switching. Furthermore, for operation at high frequency, the cylinder length can be shortened so that the cylinder chambers are reduced thereby accommodating extending performance at higher frequencies. This enables a system whereby the reciprocating mass is located near the center of the chamber within the cylinder. This enables the extended frequency performance mentioned. The present disclosure further sets forth a mechanism whereby the head area can be extended. Through this technique, there is an enhanced head region so that low frequencies can be generated by involving the added head region. It it not involved for operation at high frequencies. In other words, this reduces the volume of the head area so that hydraulic fluid requirements are reduced at high frequencies.

The present apparatus is a wide frequency range, sweep frequency vibrator of elongate cylindrical construction which especially finds use in downhole seismic generators. It is a system which is hydraulically powered where the hydraulic fluid is delivered through two separated three-way valves. They are located at opposite ends of the structure. Primarily, the structure involves an elongate cylindrical chamber or housing which is closed at the ends. There is a vibrating mass which is driven in a double acting mode. As will be detailed, it is driven at different frequencies depending on the switching of the hydraulic fluid which is delivered through the valves. Examples of operation will be given.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

Figure 1:
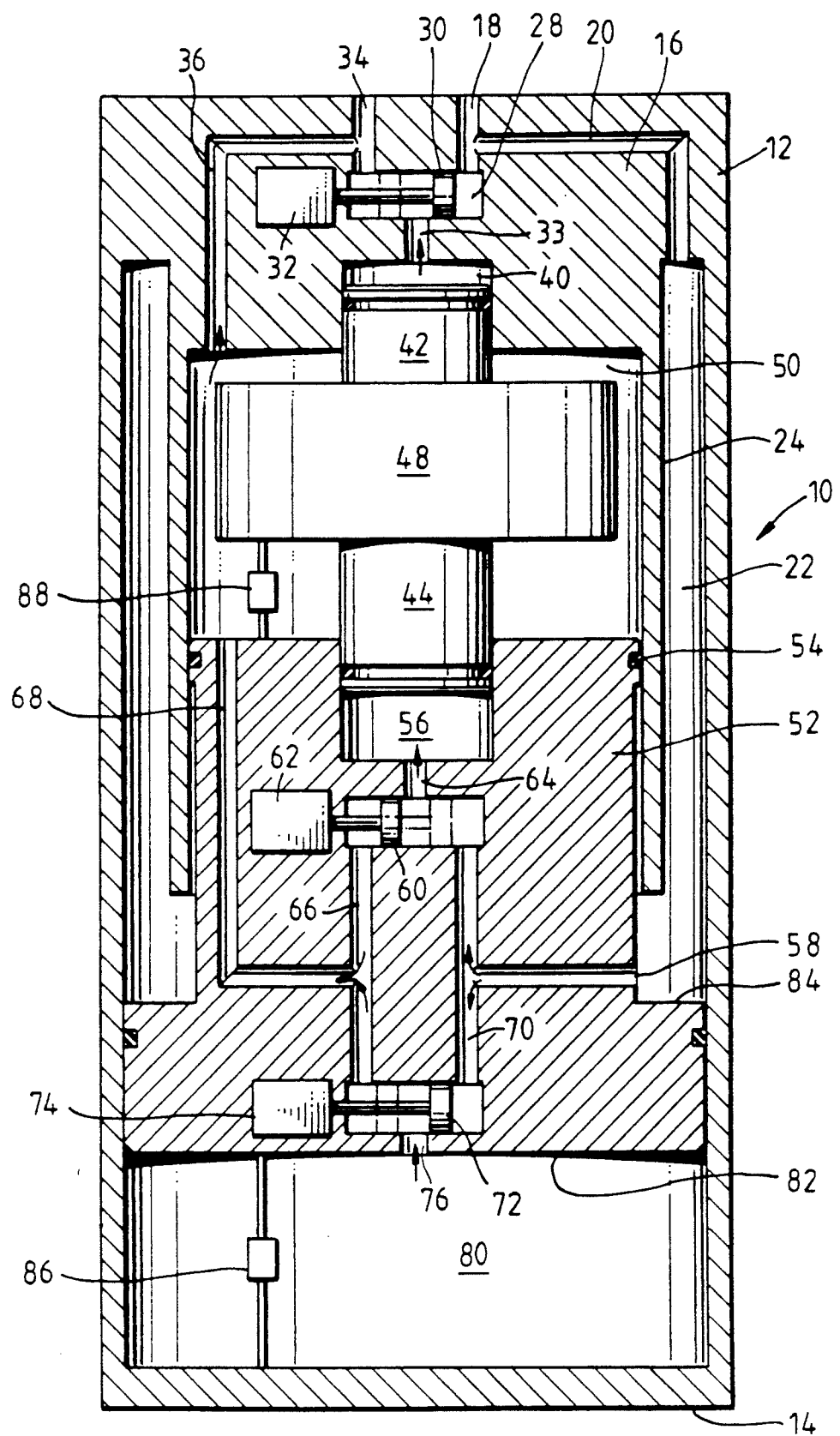

The single drawing is a sectional view through a sweep frequency vibrator constructed in accordance with the present disclosure.

DETAILED DESCRIPTION OF THE PREFERRED EMBODIMENT

In the drawings, the numeral 10 identifies the sweep frequency vibrator of this disclosure. This structure is provided with an elongate cylindrical shape or profile which enables it to be positioned in a well borehole. It is constructed with a length and diameter that enables it to be supported in that work environment. The present apparatus is powered by hydraulic oil which is delivered under pressure from a pump not shown. The apparatus is constructed with an elongate cylindrical housing 12 which terminates at a bottom plate 14 which is integral with the housing. At the top end, a relatively thick cylinder head 16 is incorporated. It is preferably formed as a separate component and is welded to the housing 12. The head incorporates an inlet port 18 where hydraulic fluid under pressure is delivered from a pump. The pump delivers this hydraulic oil flowing through the port 18 and then into the passage 20. The passage 20 opens into a cylindrical surrounding annular space 22 on the interior of the housing. The chamber 22 is defined by a cylindrical liner 24 which is just on the interior of the housing.

The port 18 delivers hydraulic oil under pressure into a chamber 28. The chamber 28 encloses a solenoid valve 30, the valve 30 cooperating with the solenoid coil 32 which is attached to it. The valve controls flow from the solenoid coil 32 which is attached to it. The valve controls flow a port 33. More will be noted regarding this port later. When the valve is switched so that flow is into the port 33, a stroke in one direction is initiated. When the valve 30 is switched to the opposite state, the valve 30 closes the port 33 so that high pressure fluid flows only into the flow line 20. The valve 30 then permits flow from the port 33 to vent through the outlet port 34. As will be understood, the port 34 is connected to the sump. There is an additional line 36 connected to the outlet port 34. The exhaust line 36 returns other fluid to the sump as will be described.

The present system includes a recessed chamber 40 in the head 16. This comprises one of the two facing chambers in which the reciprocating mass is guided and driven. The chamber 40 communicates with the port 33; the interior wall of the chamber is cylindrical and is smoothly finished so that it will receive a seal ring on a piston 42. The piston 42 cooperates with an opposite piston 44. In effect, the two pistons 42 and 44 form a single structure which is a reciprocating piston. Between the two piston ends 42 and 44, there is a substantial mass 48 which is vibrated and which creates the sweep frequency signal of interest. That operation will be explained in detail. The mass 48 is received in a chamber 50. Ideally, the chamber is maintained at a reduced pressure. The volume of the chamber 50 does not change with each stroke; in other words, the chamber is on both sides of the reciprocating mass 48 and therefore provides a cavity where the mass is permitted its movement. In addition, the chamber 50 is filled with fluid routed to the sump. This low pressure fluid fills the chamber 50. The back pressure prevailing at the sump line is observed at the O-rings which seal the chamber 50.

Continuing with the description, the sleeve 24 aligns a plug 52 for vertical movement. The plug 52 is constructed so that it forms a seal at the seal ring 54 on the interior of the sleeve 24. The plug has a recessed and aligned central cylinder head space 56 which is similar to the upper cylinder head space 40 previously mentioned. The cylinder head volumes 40 and 56 are equal and opposite to each other. They are both provided with equal area piston ends 42 and 44. They are both provided with inlet ports to deliver hydraulic oil under pressure to drive the reciprocating mass 48 in the intended fashion. Hydraulic fluid is introduced under pressure to the chamber 56 after flowing along a particular route. This route involves the annular space 22 previously mentioned just inside the cylinder housing 12. The plug 52 includes a passage 58 which diverts high pressure oil flow to a valve 60 similar to the valve 30 just mentioned and the valve 60 is also operated by a solenoid coil 62. The switched hydraulic flow is delivered through the port 64 into the chamber 56. It is vented from the chamber 56 by operation of the valve 60. That involves exhaust fluid flow through the passage 66. The passage 66 connects with a continuing passage 68 which opens into the chamber 50 previously mentioned.

Hydraulic fluid flow delivered into the plug through the passage 58 also flows through another passage 70 to a valve 72 which is operated by a solenoid coil 74. That delivers fluid under pressure to a port 76 which is below the plug 52. The port 76 introduces oil under pressure into a large chamber 80 which is below the plug. This provides hydraulic fluid which acts on the piston face 82. The same oil pressure acts on the opposite piston face 84. The piston face 84 is smaller than the face 82 and therefore the introduction of oil under pressure into the chamber 80 forces the plug 52 upwardly as a result of the area differential just mentioned. This is important in the operation of the device.

The present system incorporates two sensors. One sensor is the measuring device 86 which is in the chamber 80. This measures the spacing of the plug 52 so that it does not bottom out. More importantly, the plug position is measured by the displacement sensor 86 to assure that the plug 52 is moved as frequency changes occur. An example of this will be given later. The sensor 86 is a displacement sensor. A similar displacement sensor 88 is also included in the chamber 50. It is connected to the reciprocating mass 48 to assure that is does not bottom out in its travel. When an example is given, the significance of this will be understood.

Consider as one example the operation of this system where the mass 48 is reciprocated in a wide frequency range such as sweeping from a low frequency of 10 hertz to a high frequency of 600 hertz. This is a change of 60 fold in frequency. The change in piston stroke length must be $60^2$ or 3600 times the length. Assuming a mass of 100 lbs for the moveable mass 48, and further assuming a desired output force of 2000 lbs, the stroke at 10 hertz is about 1.9 inches. The stroke at 600 hertz is about 0.0005 inches. This variation is achieved by the present apparatus. Explaining in some detail, when the system is operated at the low frequency, the valves 30 and 60 are switched in timed sequence so that the piston ends 42 and 44 are driven back and forth with a stroke of 1.9 inches length. When that occurs, the chamber 50 is relatively large. It is sufficiently large that the stroke of 1.9 inches can be accommodated without bottoming out. Furthermore, the piston stroke is powered by the double acting arrangement so that one piston end is provided with a power stroke while the opposite piston end stroke returns hydraulic oil to the sump on the low pressure side of the hydraulic system. When reversal occurs, the valves 30 and 60 reverse their operative states and drive the reactionary mass 48 in the opposite direction. As will be observed, the positional measurement is constantly made by the displacement sensor 88 to assure that there is adequate clearance. Clearance is changed by opening or closing the valve 72. This permits the plug 52 in the cylindrical housing to move, thereby changing the relative size of the chamber 80. As will be understood, as the chamber 80 increases in volume, the chamber 50 decreases in volume. As will be further understood, the low frequency operation requires that the chamber 50 be larger and the chamber 80 be smaller. By contrast, as the frequency is increased, the excursion of the reactionary mass 48 is reduced. As it is reduced, a shorter stroke is involved as a result of the more rapid operation of the solenoid valves 30 and 60. When the shorter stroke is initiated by increasing the frequency of switching, the plug 52 is forced upwardly. This is accomplished while measuring the displacement sensor 86. The displacement sensor 86 thus provides a signal which enables opening or closing of the valve 72 to change the relative size of the chamber 80. Since hydraulic oil is introduced into the chamber 80 from the pump, and since the piston face 82 is greater in area than the opposite piston face 84, the plug 52 is forced to move upwardly. In effect, this shortens the length of stroke of the reactionary mass, and thereby reduces the volume of oil involved in the high frequency operations. With the shorter stroke, the reactionary mass 48 is able to form the high frequency signals that are so desirable.

It is not uncommon to operate from the lowest possible frequency to the highest possible frequency over an interval of perhaps 10 to 30 seconds. This is sufficient time so that the plug 52 is changed in location. Such changes in location accommodate the vibrator system so that high frequency operation can be achieved. The high frequency signal can be achieved because the amount of hydraulic fluid involved in the short stroke high frequency operation is reduced. One important feature is the short ports 33 and 64. They are very short passages to reduce fluid volume. The small volume enables switching of the valves 30 and 60 at higher frequencies. Less oil is required at higher frequencies by reducing the volume of the ports connecting into the cylinder head spaces 40 and 56.

As will be understood, the valves 30 and 60 are solenoid operated valves provided with coils at 32 and 62. They are driven by equal and opposite signals. When one valve is open, the other is closed. The valves reverse in synchronized fashion. Moreover, the valves reverse at a frequency which is controlled by the operator so that switching does occur in the timed sequence to provide the necessary sweep frequency operation.

As will be understood, the vibrator 10 of the present disclosure is mounted in a well tool momentarily anchored in a well borehole. When used at the surface, it is normally fastened or otherwise rested on the ground in sufficient fashion to couple the vibrations into the earth. The supporting apparatus in believed to be well known and understood.

While the foregoing to directed to the preferred embodiment, the scope is determined by the claims which follow:

I claim:

1. A variable frequency seismic wave generator comprising:
    an elongate generally cylindrical housing having closed ends and a diameter enabling said housing to be positioned in a well borehole;
    a moveable reactionary mass within said housing, said reactionary mass supported by a pair of opposing piston ends;
    a first assembly defining a first fluid filled chamber configured to receive a first of said piston ends; and
    a second assembly defining a second fluid filled chamber configured to receive the second of said piston ends; and
    means for moving said first and second assemblies relative to one another to alter the relative volumes of said first and second chambers.

2. The apparatus of claim 1, further comprising first and second fluid flow control valves located immediately adjacent to said first and second chambers to control fluid flow into said first and second chambers to move said reactionary mass.

3. The apparatus of claim 2, wherein said first assembly comprises:
    a first fluid flow port communicating with said first chamber, and wherein
    said first control valve is operatively connected to said first fluid flow port to control fluid flow through said port, and wherein said control valve is a three way valve including:
        an inlet port,
        an outlet port, and
        an exhaust port; and
    wherein said second assembly comprises:
    a second fluid flow port communicating with said second chamber, and wherein said second control valve is operatively connected to said fluid flow port to control fluid flow through said second port and wherein said control valve is a three way valve, comprising,
        an inlet port,
        an outlet port, and
        an exhaust port.

4. The apparatus of claim 3, wherein said first and second control valves each includes a solenoid coil.

5. The apparatus of claim 4, wherein each of said first and second control valves is constructed and arranged to direct fluid flow to and from said seal isolated chamber.

6. The apparatus of claim 5, wherein each of said fluid flow control valves is located in a chamber communicating with a short fluid flow line whereby action of said control valves alters flow volume downstream of said valves.

7. The apparatus of claim 6, wherein said control valves periodically reverse to enable reactionary mass movement.

8. The apparatus of claim 1, wherein said moving means comprises a moveable plug positioned in said housing for altering the volume of hydraulic fluid in said first and second chambers to determine the movement of said reactionary mass.

9. The apparatus of claim 8, wherein said plug is positioned in said housing to move between two positions in response to operation of a plug control valve.

10. The apparatus of claim 8, wherein said plug control valve admits hydraulic fluid to act on said plug to change the position thereof.

11. A method of creating a sweep frequency sonic wave, comprising the steps of:
    positioning a reactionary mass between a pair of piston ends located in fluid filled chambers spaced from said mass to enable said mass to vibrate as said piston ends move said mass;
    providing a cyclic flow of hydraulic fluid to act on said piston ends to initiate and sustain vibration of said reactionary mass;
    moving said chambers relative to one another to alter the vibration range of movement of said reactionary mass as a function of the desired vibration frequency; and
    monitoring the reactionary mass movement.

12. The method of claim 11, wherein the step of providing a cyclic flow of hydraulic fluid includes operating a pair of fluid flow control valves in synchronized and timed relationship to enable hydraulic fluid pressure to be alternately applied to said piston ends.

13. The method of claim 12, wherein said control valves are positioned immediately adjacent to said piston ends.

14. The method of claim 13, further including the step of providing a common source of fluid flow under elevated pressure to said control valves and then to said piston ends.

15. The method of claim 11, further including the step of positioning a plug in a housing to define said chamber means cooperative with said reactionary mass to enable reduction of the vibration range of movement.

16. A method of forming a variable frequency vibration in a well borehole, comprising the steps of:
   positioning a housing in a well borehole wherein one end of said housing is closed by an end closure means and the remaining end of said housing is closed by a moveable plug;
   in said housing, positioning a reactionary mass having a pair of spaced piston ends to enable said mass and piston ends to move as a unit;
   positioning upper and lower fluid flow control valves adjacent to said piston ends;
   providing high pressure fluid flow through said control valves to said piston ends to alternately move said reactionary mass and said piston ends subject to said high pressure fluid flow;
   controlling the control valves to alter the position of said moveable plug in said housing to vary the direction of movement of said reactionary mass and said piston ends, and thereby to vary the frequency and amplitude of vibration from said reactionary mass.

17. The method of claim 16, wherein said plug is moved to alter the effective length of said housing dependent on vibration frequency and amplitude.

* * * * *

UNITED STATES PATENT AND TRADEMARK OFFICE
CERTIFICATE OF CORRECTION

PATENT NO. : 5,331,607
DATED : July 19, 1994
INVENTOR(S) : Dennis E. Roessler

It is certified that error appears in the above-identified patent and that said Letters Patent is hereby corrected as shown below:

In column 3, lines 9 and 10, please delete "the solenoid coil 32 which is attached to it. The valve controls flow a port 33" and replace with --the high pressure inlet port 18 through the valve 30 and out through a port 33--.

Signed and Sealed this

Twenty-eight Day of February, 1995

Attest:

BRUCE LEHMAN

Attesting Officer

Commissioner of Patents and Trademarks